Aug. 27, 1957  R. J. HALL  2,803,918
ANIMAL TRAP
Filed April 9, 1956

Robert J. Hall
INVENTOR

Albert H. Kirchner
BY
ATTORNEY

United States Patent Office 2,803,918
Patented Aug. 27, 1957

2,803,918
ANIMAL TRAP
Robert J. Hall, Dunbar, Pa.
Application April 9, 1956, Serial No. 577,010
9 Claims. (Cl. 43—61)

The present invention relates to animal traps and more particularly to a type of trap for the live capture of small game.

A principal object of the invention is to provide an adjustment for the actuating means for the trap which will keep the trap from being sprung by unwanted animals.

Prior are traps of the general type to which this invention relates, comprising box-like housings baited and held open and adapted to be sprung to closed position by an entering animal, are generally capable of being sprung by other, unwanted kinds of animals. The trap, thus sprung, is disabled, i.e., it is no longer open for the capture of another animal, until it is serviced by the operator of the trap who must open it, release the unwanted animal and reset the trap.

Thus, traps of this general type set for the capture of rabbits, for example, are frequently found sprung and closed by small birds, field mice and the like.

The principal object of the present invention is to provide a trap that can be set to operate on an adjustable predetermined degree of actuation only, and to be proof against closing upon the imposition of any lighter force or smaller degree of movement, as by that capable of being applied by a small bird, mouse or the like in the case of adjustment of the trap for the capture of rabbits or the like.

Other objects are to provide a trap of the general character indicated which will be simple and efficient to manufacture and operate, which will be durable and foolproof in use, and which will incorporate other and further advantages as will be evident to those skilled in the are from the following specification.

Figure 1:
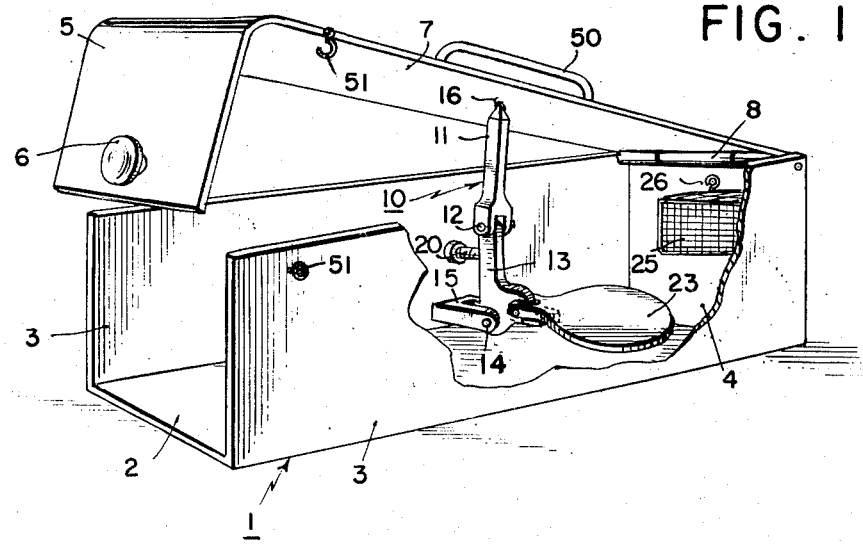
Figure 2:
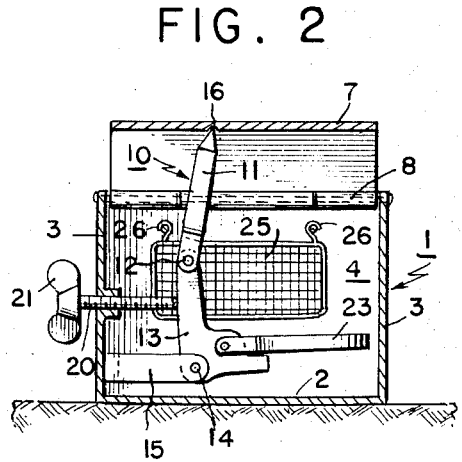
Figure 3:
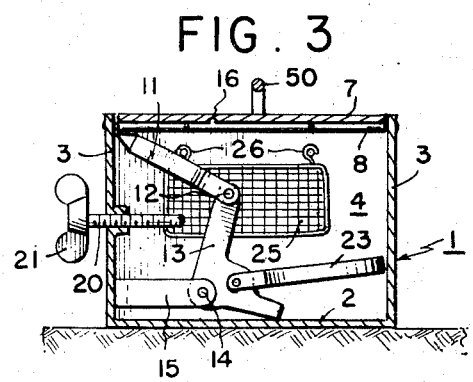

In the accompanying drawing, illustrating a preferred embodiment of the invention that has been reduced to practice and found entirely satisfactory and which is therefore at present preferred, Figure 1 is a perspective view, partly broken away, showing an embodiment of the invention with the trap set in open, operative position;

Fig. 2 is a transverse vertical sectional view showing the trap in the Fig. 1 position; and Fig. 3 is a similar sectional view showing the trap in the sprung or closed position.

As shown in the drawing, the trap comprises a housing or casing 1 of generally rectangular or oblong box-like shape, made up of sheet metal, hard plastic or wood wall members including a floor or bottom 2, a pair of side walls 3, 3 and a single end wall 4 closing what may be regarded as the rear end of the housing. The opposite or front end is left open, as is the top of the housing.

A closure in the form of a door 5 is provided for the open front end of the housing, and a knob 6, preferably made of heavy metal such as iron or lead, is detachably mounted on the outer side of the door, as by a screw or bolt. This closure may be made of material similar to that of the floor and walls and in the preferred embodiment is integrally connected with a roof panel 7 which is hinged at 8 to the upper edge of the rear wall 4 of the housing. The roof and closure 5 may be stamped from sheet metal, molded from hard plastic, or otherwise made of united plywood or other board sheets.

The tripping mechanism for releasing the closure 5 from its open position of Figs. 1 and 2 to its closed position of Fig. 3 comprises a toggle generally designated 10. As shown in the illustrated embodiment, this toggle consists of an upper link 11 pivoted at 12 to a lower link 13 which is hinged at its lower end by a pivot pin 14 to a bracket 15 secured to one of the side walls 3 close to the floor 2 of the housing and somewhat nearer to the rear end wall 4 than to the open front end. The upper end of the upper link 11 may be reduced to a blunt point and, when the toggle is in the erected position shown in Figs. 1 and 2, this upper end of the upper link is seated in a shallow depression 16 properly positioned in the undersurface of the roof 7 directly above the pivot pin 14, i. e., nearer to the side wall bearing the bracket 15 than to the other side wall. In this position the toggle links are set at one side of dead center (at the left hand side as shown in Fig. 2) with one of the links, preferably the lower one 13, bearing against an abutment in the form of a setscrew 20 threaded through the side wall 3 toward which the toggle leans and having a handle, knob or head 21 on its outer end by which the setscrew may be turned to advance or retract its inner end so as to vary the extent to which the toggle may lean, all as is believed to be clearly shown by Fig. 2.

The lower link 13 of the toggle carries, preferably pivoted to it, a trigger 23, best made in the form of a flat plate as shown, which extends laterally out from the toggle toward the opposite side wall 3 of the housing, so as quite substantially to obstruct the interior of the housing. That is to say, the arrangement is such that the trigger will necessarily be touched by any animal entering the housing and attempting to pass toward the rear wall 4 thereof.

Mounted on the rear wall 4 is a bait-holder 25. This may be made in any convenient form for holding appropriate bait and making the same evident to an animal at the front or open end of the housing. In the illustrated embodiment the holder comprises a small receptacle hung on the wall by a hook or pair of hooks 26 and having a front made of open mesh screen for exposing the bait that forms the contents of the receptacle.

In operation, bait is put in the bait-holder 25 and the toggle is set in the erected position shown in Figs. 1 and 2, with the setscrews 20 adjusted so as to provide an appropriately positioned abutment for the toggle. This position, which is readily determined by experiment, should be such as to cause the toggle to be set with sufficient sensitivity or lack of sensitivity so as to be operable only when an animal of the size, weight and strength of the animal for which the trap is set encounters the trigger 23 in movement for the bait-holder 25. Thus, if for example the trap is set for rabbits, the setscrew will be positioned so as to introduce sufficient angularity in the toggle to hold the toggle against collapse upon the imposition of such little force or weight on the trigger 23 as may be applied by a small bird, field mouse or the like. As is deemed to be obvious from the drawing and the foregoing explanation, when the trigger is depressed by the weight or force of an animal moving over it, the toggle is collapsed by the links swinging to the right as viewed in Fig. 2, the parts then assuming the position shown in Fig. 3, with the top 7 and closure 5 lowered to entrap the animal.

Cooperating with the sensitivity adjustment of the trap provided by the setscrew 20 is the knob 6 which, it will be recalled, is best made of heavy metal such as iron or lead and is detachable. Preferably several such knobs, of graduated weight, are provided and in use of the trap a knob is selected for use which will give the closure the proper total weight, not only for permitting the toggle to collapse only when an animal of the desired kind actuates the trigger, but also to hold the closure in closed position with the animal entrapped. This detachability and replaceability of means for adjusting the weight of the closure is regarded as an important feature of the preferred and most complete embodiment of the invention.

Additional features that may be used to advantage are the carrying handle 50 mounted on the top of the roof panel 7 and some such means as the hook and eye 51 applied to the roof and a side wall to hold the roof and closure in closed position when the trap is being carried.

It has been found that the trap can be used successfully under water for trapping fish and marine animals, particularly turtles. In such use the bait box may be lowered to the floor of the trap, if desired, and may be used to contain living minnows or other live bait.

It is believed that the purpose of the invention, as well as its principal advantages, will be understood from the foregoing explanation of the preferred embodiment. It is to be understood that other and further modified embodiments are contemplated, all within the scope and purview of the broader of the appended claims.

I claim:

1. An animal trap comprising a housing having an open front, a closure therefor, and means normally holding the closure in open position operative to release the closure for movement to closed position comprising a normally erect toggle within the housing operatively connected to the housing and the closure, a trigger adapted when moved to cause the erected toggle to collapse and thereby release the closure, and an abutment means operable from the exterior of the housing bearing against the toggle and determining the angular relationship of the links of the toggle when erected.

2. The combination claimed in claim 1, in which the abutment is a setscrew threaded through a wall of the housing.

3. The combination claimed in claim 1, in which the closure includes a roof and a front for the housing rigidly connected together and which is hinged to the housing at the end thereof opposite said open front end, and in which the upper end of the erected toggle supports the closure in elevated position to be lowered by gravity on collapse of the toggle.

4. The combination claimed in claim 1, in which the trigger projects laterally from a link of the toggle in substantially obstructing position within the housing.

5. The combination claimed in claim 1, including bait-holding means within the housing at the end thereof opposite the open front end, and in which the trigger projects laterally from a link of the toggle in substantially obstructing position within the housing so as to be engaged by an animal moving toward the bait-holding means.

6. The combination claimed in claim 1, in which said closure includes a roof and a front portion for the housing hinged to the housing at the end thereof opposite the open front end and connected together at said open front end, the upper end of the erected toggle being engaged with the roof to support the closure in elevated position to fall by gravity to closed position on collapse of the toggle, and including bait-holding means adjacent the hinged end of the roof.

7. The combination claimed in claim 1, in which said closure includes a roof and a front portion for the housing connected together at one end and being hinged at its other end to the housing, bait-holding means disposed within the housing adjacent said hinged end, the toggle being disposed between said open front end and said bait-holding means and being engaged with the roof to support the closure in elevated position to fall by gravity to closed position on collapse of the toggle, and said trigger projecting laterally from a link of the toggle in substantially obstructing position within the housing so as to be engaged by an animal moving toward the bait-holding means and thereby cause collapse of the toggle.

8. The combination claimed in claim 1, including a weight removably mounted on the closure.

9. The combination claimed in claim 1, in which said abutment means is adjustable and said closure includes means for selectively mounting a plurality of elements of graduated weight which are adapted to cooperate with the adjustment provided by the abutment for determining the sensitivity of the trigger release.

References Cited in the file of this patent

UNITED STATES PATENTS

| | | |
|---|---|---|
| 1,633,857 | Gonzalez | June 28, 1927 |
| 2,059,238 | Howland | Nov. 3, 1936 |